(12) United States Patent
Fukinuki et al.

(10) Patent No.: US 12,046,950 B2
(45) Date of Patent: Jul. 23, 2024

(54) BRUSHLESS MOTOR AND HANDHELD POWER TOOL USING THE SAME

(71) Applicant: Nanjing Chervon Industry Co., Ltd., Nanjing (CN)

(72) Inventors: Masatoshi Fukinuki, Nanjing (CN); Yasheng Chen, Nanjing (CN); Wei Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 803 days.

(21) Appl. No.: 17/116,809

(22) Filed: Dec. 9, 2020

(65) Prior Publication Data

US 2021/0091614 A1   Mar. 25, 2021

Related U.S. Application Data

(63) Continuation of application No. PCT/CN2019/089838, filed on Jun. 3, 2019.

(30) Foreign Application Priority Data

Jun. 28, 2018 (CN) .......................... 201810687264.7

(51) Int. Cl.
| | |
|---|---|
| *H02K 1/18* | (2006.01) |
| *B23B 45/00* | (2006.01) |
| *B25F 5/00* | (2006.01) |
| *B25F 5/02* | (2006.01) |

(Continued)

(52) U.S. Cl.
CPC ........... *H02K 1/185* (2013.01); *B23B 45/008* (2013.01); *B25F 5/001* (2013.01); *B25F 5/02* (2013.01);
(Continued)

(58) Field of Classification Search
CPC ........ H02K 1/185; H02K 7/083; H02K 7/116; H02K 7/145; H02K 21/16; H02K 3/325;
(Continued)

(56) References Cited

U.S. PATENT DOCUMENTS

| | | | |
|---|---|---|---|
| 2011/0169358 A1* | 7/2011 | Furukawa | ............ H02K 11/22 310/89 |
| 2014/0339930 A1 | 11/2014 | Bekavac | |

(Continued)

FOREIGN PATENT DOCUMENTS

| | | |
|---|---|---|
| CN | 201374636 Y | 12/2009 |
| CN | 102458775 A | 5/2012 |

(Continued)

OTHER PUBLICATIONS

ISA/CN, Int. Search Report issued on PCT application No. PCT/CN2019/089838, dated Aug. 30, 2019, 2 pages.

(Continued)

*Primary Examiner* — Thomas Truong
(74) *Attorney, Agent, or Firm* — Greenberg Traurig, LLP

(57) ABSTRACT

A brushless motor includes a stator and a rotor installed in the stator. The stator includes a front insulating frame and a rear insulating frame. The rotor includes a rotating shaft, a front bearing, a rear bearing, a front-end cover and a rear-end cover. The front-end cover is located on the front side of the rotor and installed on the front bearing. The rear-end cover is located on the rear side of the rotor and is installed on the rear bearing and abuts against the rear insulating frame. The front side of the front insulating frame is provided with multiple first snap parts. The front-end cover is provided with multiple second snap parts in the circumference. The first snap parts are snap-fitted with the second snap parts.

7 Claims, 9 Drawing Sheets

(51) Int. Cl.
  *H02K 1/04*   (2006.01)
  *H02K 7/08*   (2006.01)
  *H02K 7/116*  (2006.01)
  *H02K 7/14*   (2006.01)
  *H02K 21/16*  (2006.01)
  *B25B 21/02*  (2006.01)
(52) U.S. Cl.
  CPC .............. *H02K 7/083* (2013.01); *H02K 7/116* (2013.01); *H02K 7/145* (2013.01); *H02K 21/16* (2013.01); *B25B 21/02* (2013.01)
(58) Field of Classification Search
  CPC .......... H02K 5/04; H02K 5/15; H02K 5/1732; H02K 1/146; H02K 29/00; H02K 5/161; B23B 45/008; B23B 45/02; B23B 2260/062; B25F 5/001; B25F 5/02; B25F 5/00; B25B 21/02; B25B 21/00
  See application file for complete search history.

(56) References Cited

U.S. PATENT DOCUMENTS

2016/0354911 A1\* 12/2016 Aoki ...................... H02K 11/21
2017/0294819 A1\* 10/2017 Crosby .................. B25F 5/008

FOREIGN PATENT DOCUMENTS

| DE | 102015115153 A1 | 3/2017 |
| EP | 3229350 A1 | 10/2017 |
| JP | 2012029350 A | 2/2012 |
| KR | 100796310 B1 | 1/2008 |

OTHER PUBLICATIONS

EPO, extended European search report issued on European patent application No. 19824544.1, dated Jul. 14, 2021, 7 pages.

\* cited by examiner

BRUSHLESS MOTOR AND HANDHELD POWER TOOL USING THE SAME

RELATED APPLICATION INFORMATION

The present disclosure claims priority to Chinese Patent Application No. 201810687264.7 filed with the CNIPA on Jun. 28, 2018, the disclosure of which is incorporated herein by reference in its entirety.

TECHNICAL FIELD

The present disclosure relates to an electric motor, for example, to a brushless motor and a handheld power tool using the same.

BACKGROUND

In an existing handheld power tool, the split-type brushless motor is installed as follows. A stator and a rotor are separately installed in the housing, and then the housing is used to position the rotor. The air gap between the stator and the rotor needs to be additionally adjusted. However, different batches of handheld power tools may have different air gaps between the stator and the rotor because of the deformation of the housing. Thus, the coaxiality of the stator and the rotor cannot be guaranteed, resulting in an unreliable performance of the electric motor. Therefore, there is an urgent demand for integrally-assembled electric motors. In addition, with the trend of miniaturization of handheld power tools such as electric drills, screwdrivers, and impact wrenches, miniaturization of the integrally-assembled electric motors is also needed.

SUMMARY

The present disclosure provides a brushless motor providing ease of assembly and low manufacturing cost, and a handheld power tool using the same.

To achieve the preceding object, the present disclosure adopts the following technical solutions.

There is provided a brushless motor that includes a stator and a rotor. The stator has a front side and a rear side. The rotor has a front side and a rear side and is installed in the stator. The stator includes a front insulating frame and a rear insulating frame. The front insulating frame is disposed on the front side of the stator. The rear insulating frame is disposed on the rear side of the stator. The rotor includes a rotating shaft, a front bearing, a rear bearing, a front-end cover and a rear-end cover. The rotating shaft is rotatable around a first axis. The front bearing is installed at the front end of the rotating shaft. The rear bearing is installed at the rear end of the rotating shaft. The front-end cover is disposed on the front side of the rotor and installed on the front bearing. The rear-end cover is disposed on the rear side of the rotor. The rear-end cover is installed on the rear bearing and abuts against the rear insulating frame. The front side of the front insulating frame is provided with multiple first snap parts. The front-end cover is provided with multiple second snap parts in the circumference of the front-end cover. The first snap parts are snap-fitted with the second snap parts.

There is further provided a handheld power tool that includes a housing, an output shaft, a gear box assembly and a brushless motor. The housing is configured to accommodate the brushless motor. The output shaft is configured to be driven by the brushless motor to rotate around a first axis. The gear box assembly is configured to enable power transmission between the brushless motor and the output shaft. The brushless motor includes a stator and a rotor. The stator has a front side and a rear side. The rotor has a front side and a rear side and is installed in the stator. The stator includes a front insulating frame and a rear insulating frame. The front insulating frame is located on the front side of the stator. The rear insulating frame is located on the rear side of the stator. The rotor includes a rotating shaft, a front bearing, a rear bearing, a front-end cover and a rear-end cover. The rotating shaft is rotatable around the first axis. The front bearing is installed at the front end of the rotating shaft. The rear bearing is installed at the rear end of the rotating shaft. The front-end cover is disposed on the front side of the rotor and installed on the front bearing. The rear-end cover is disposed on the rear side of the rotor. The rear-end cover is installed on the rear bearing and abuts against the rear insulating frame. The front side of the front insulating frame is provided with multiple first snap parts. The front-end cover is provided with multiple second snap parts in the circumference of the front-end cover. The first snap parts are snap-fitted with the second snap parts.

DETAILED DESCRIPTION

The present disclosure will be described below in detail in connection with drawings and examples.

For ease of description, definitions are given as follows. The direction of the first axis and the direction parallel to the first axis are defined as an axial direction. The direction of a circumference with the first axis as a central axis is defined as a circumference. The direction of a radius of the direction of the circumference with the first axis as the central axis is defined as a radial direction. The direction from the electric motor towards the output shaft in the first axis is defined as front, and the direction opposite to the front is defined as rear.

For ease of description, the case where the handheld power tool is an electric drill is used as an example. Of course, the handheld power tool may also be any one of other handheld power tools such as an impact wrench, a screwdriver or a multifunctional tool with both the function of the screwdriver and the function of the electric drill.

These tools, such as reciprocating saws, circular saws and jigsaws, may also be used for cutting workpieces. These tools may also be garden tools such as pruners and chainsaws.

In the related art, a brushless motor may include a stator and a rotor installed in the stator. Two ends of the stator are provided with two end covers. The stator further includes a number of connectors fixedly connecting the two end covers. The connectors pass through the inside of the stator. To position the stator axially and radially, the preceding brushless motor needs to be provided with connectors connecting the front-end cover and the rear-end cover. Although the volume of the brushless motor is reduced, the manufacturing costs and assembly complexity are increased.

Figure 1:
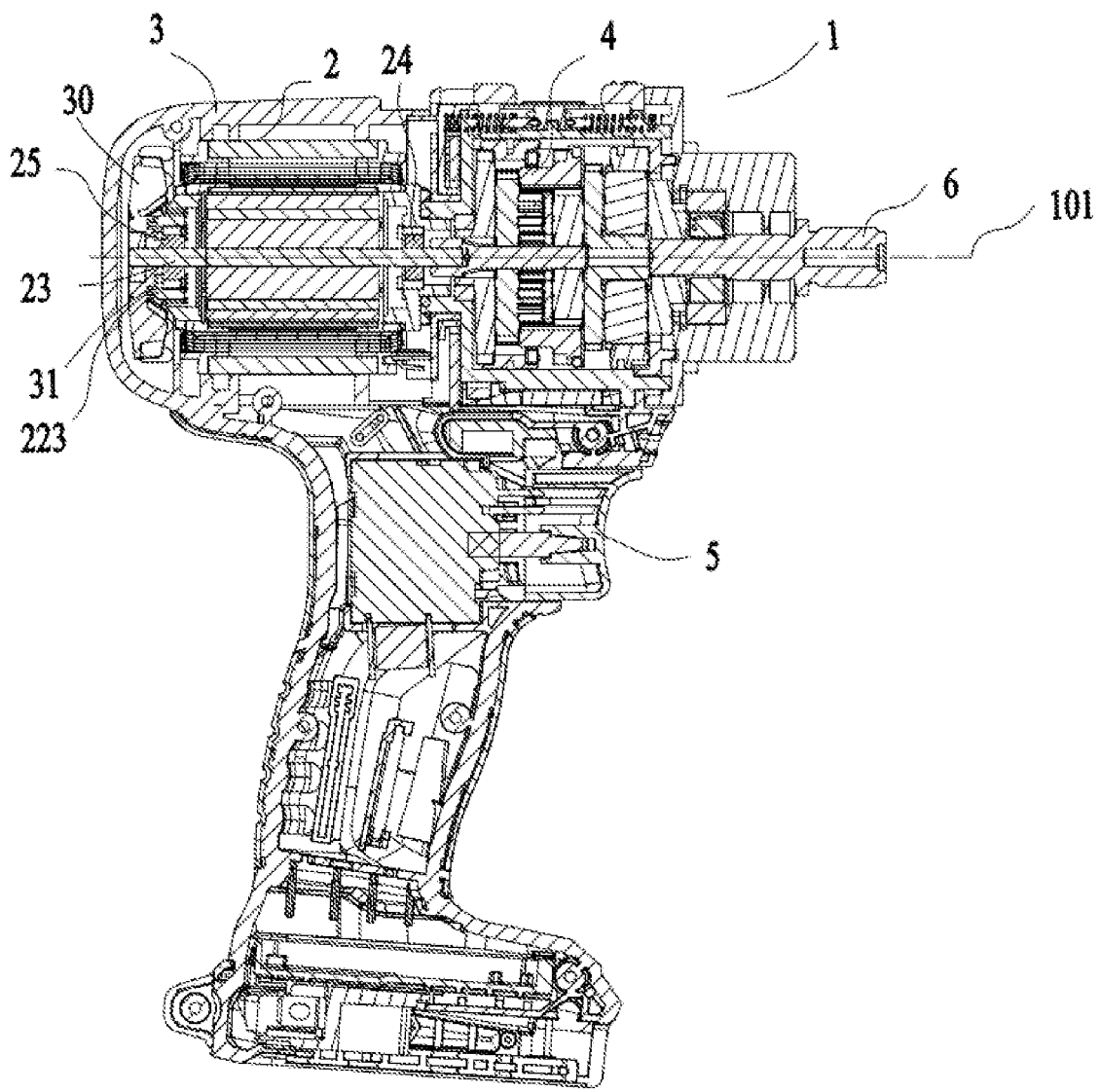
FIG. 1 is a sectional view of a handheld power tool.

Referring to FIG. 1, a handheld power tool 1 includes a brushless motor 2, a housing 3, a gear box assembly 4, a switch 5 and an output shaft 6. The brushless motor 2 and the gear box assembly 4 are disposed in the accommodation space enclosed by the housing 3. The brushless motor 2 includes a rotating shaft 23 capable of rotating around a first axis 101. The gear box assembly 4 is disposed between the brushless motor 2 and the output shaft 6. The gear box assembly 4 is configured to achieve the transmission of power between the brushless motor 2 and the output shaft 6. The switch 5 is configured to control the rotating shaft 23 of the brushless motor 2 to rotate. The output shaft 6 is used for outputting power.

Figure 2:
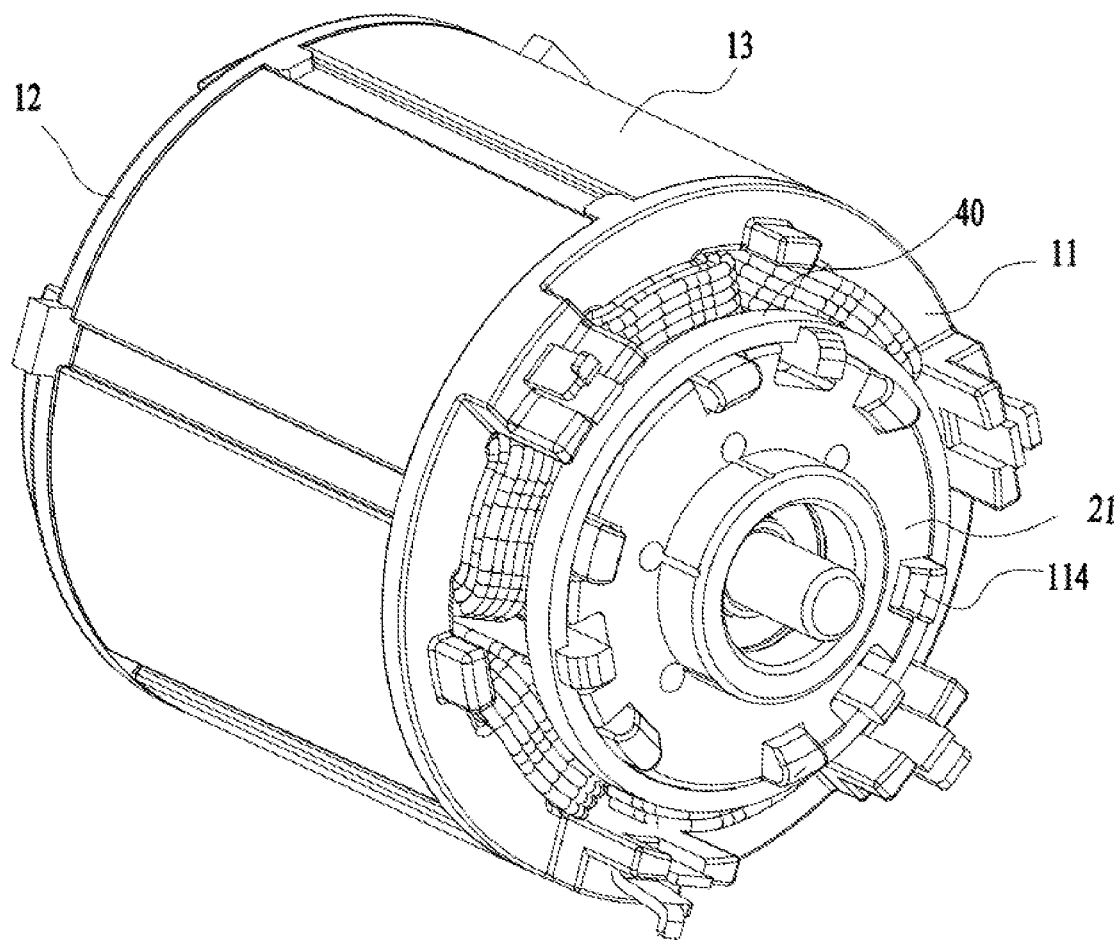
FIG. 2 is a perspective view of a brushless motor used in the handheld power tool shown in FIG. 1 viewed from the front side.
Figure 3:
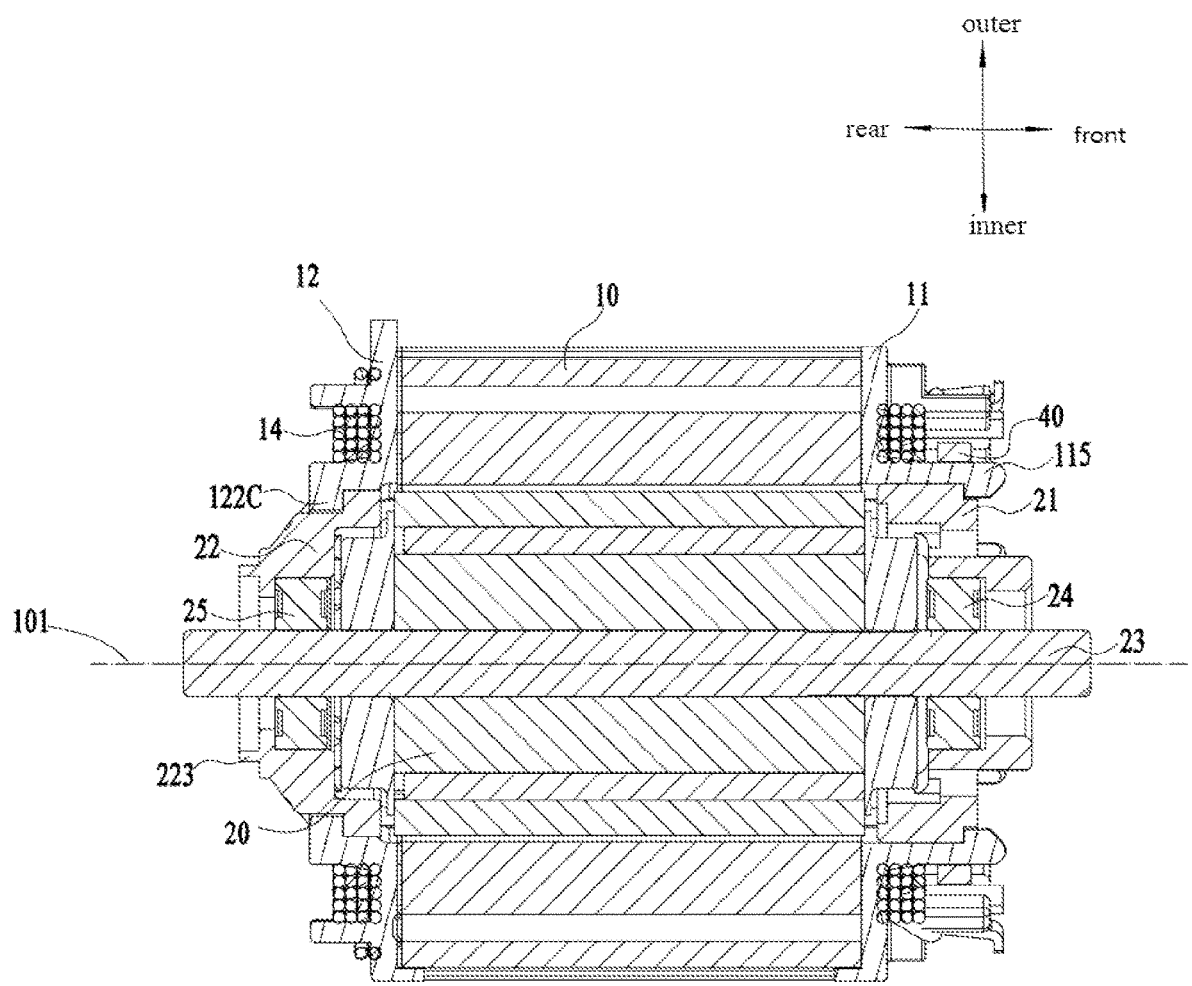
FIG. 3 is a sectional view of the brushless motor shown in FIG. 2.
Figure 4:
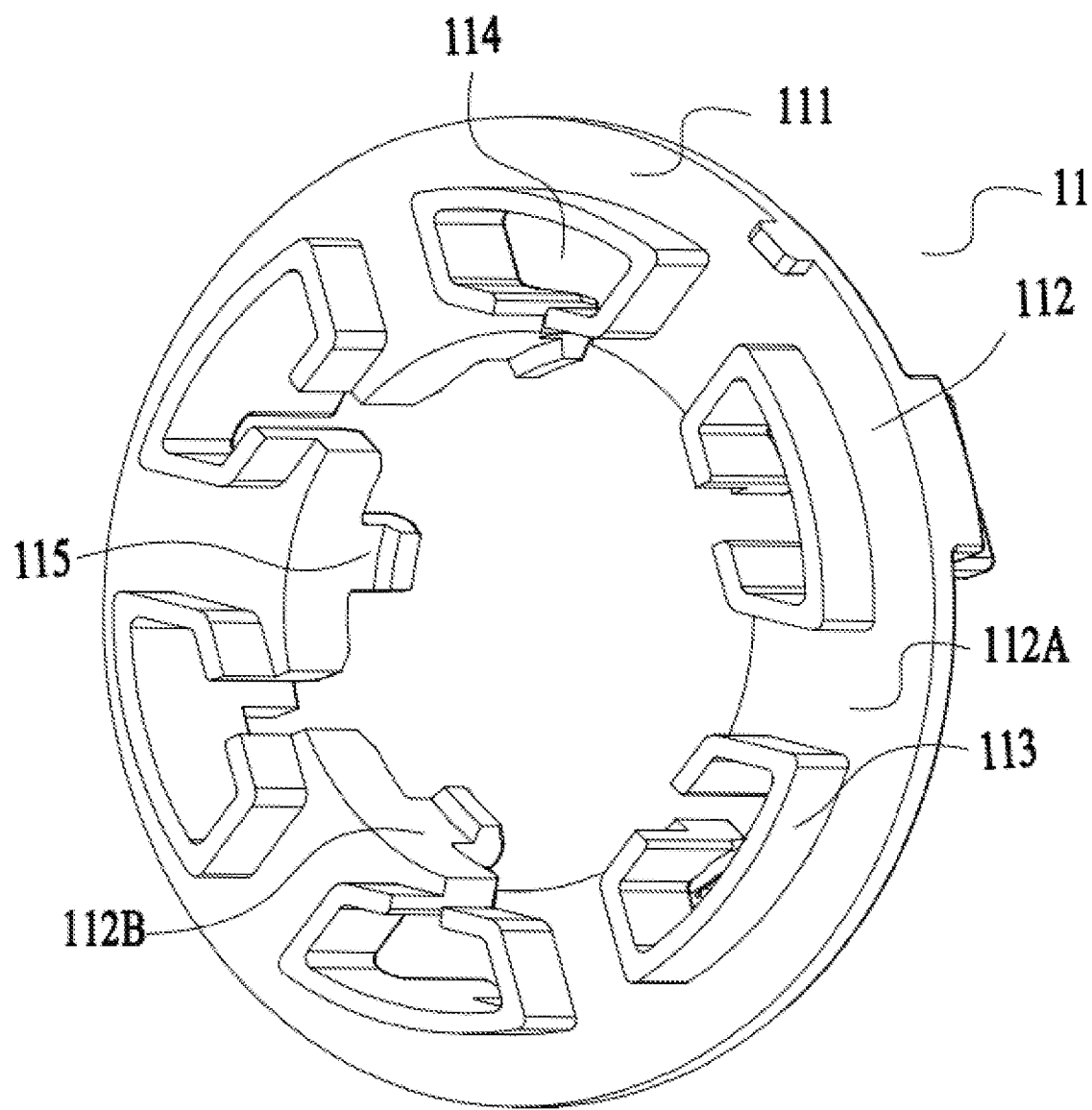
FIG. 4 is a perspective view of a front insulating frame shown in FIG. 2 viewed from the rear side.
Figure 5:
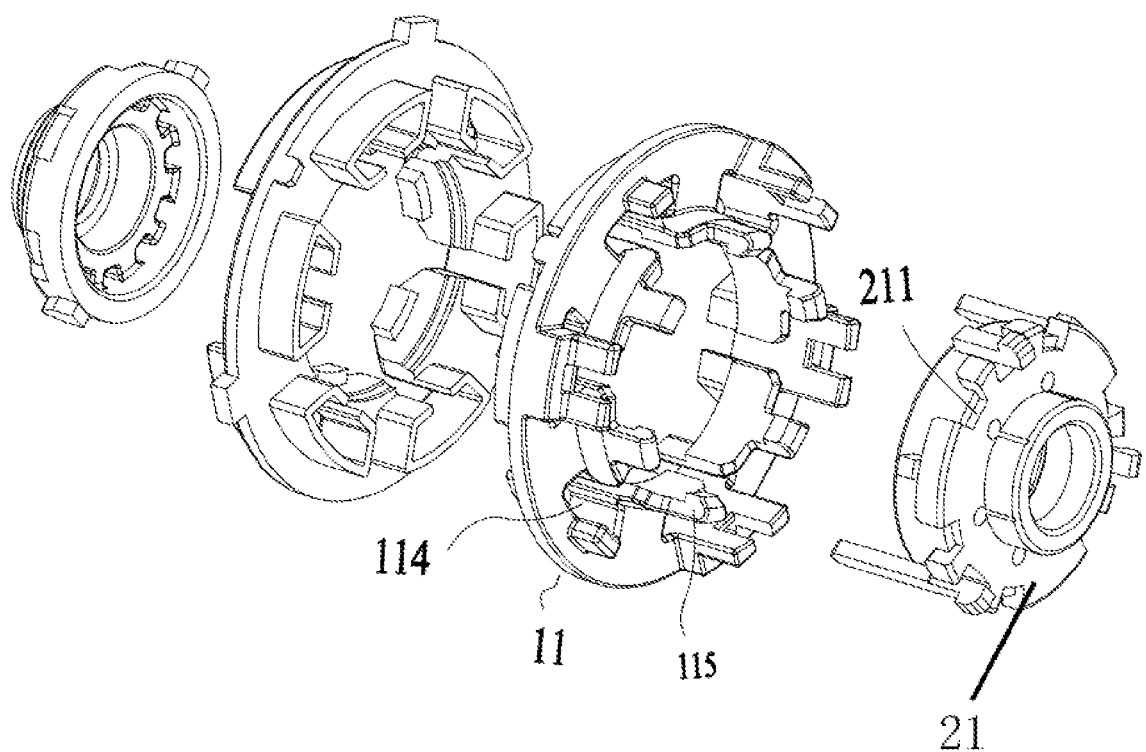
FIG. 5 is a perspective exploded view of part of the components of the brushless motor shown in FIG. 2 viewed from the rear side.

Referring to FIG. 2 and FIG. 3, the brushless motor 2 includes a stator 10 and a rotor 20 installed in the stator 10. The stator 10 has a front side and a rear side. The stator 10 includes a front insulating frame 11, a rear insulating frame 12, a silicon steel sheet group 13 and a coil 14. The front insulating frame 11 is located on the front side of the stator 10. The rear insulating frame 12 is located on the rear side of the stator 10. The silicon steel sheet group 13 is cylindrical and is formed by laminating multiple silicon steel sheets. Referring to FIG. 4 and FIG. 5, the front insulating frame 11 includes an integrally-formed first insulating base ring 111 and multiple first insulating bobbins 112 disposed on the inner wall of the first insulating base ring 111 in the radial direction. Each first insulating bobbin 112 further includes a first connection board 112A and a front inner protective plate 112B fixed on the inner side of the first connection board 112A. The front inner protective plates 112B are distributed in the circumference. Same spacing exists between every two adjacent front inner protective plates 112B.

The front side of the front insulating frame 11 further has multiple first snap parts. In some examples, the first snap parts may be elastic hook portions 115. Under the action of an external force, each elastic hook portion 115 may be elastically deformed. The rear side of the front insulating frame 11 is protrudingly provided with multiple first engaging portions 113 engaged with the slots of the silicon steel sheet group 13. The inner side of each first engaging portion 113 is provided with a first groove 114 extending in the axial direction. The first groove 114 is used for winding the coil 14 around the first insulating bobbin 112. In this example, the number of the first engaging portions is 6.

Figure 6:
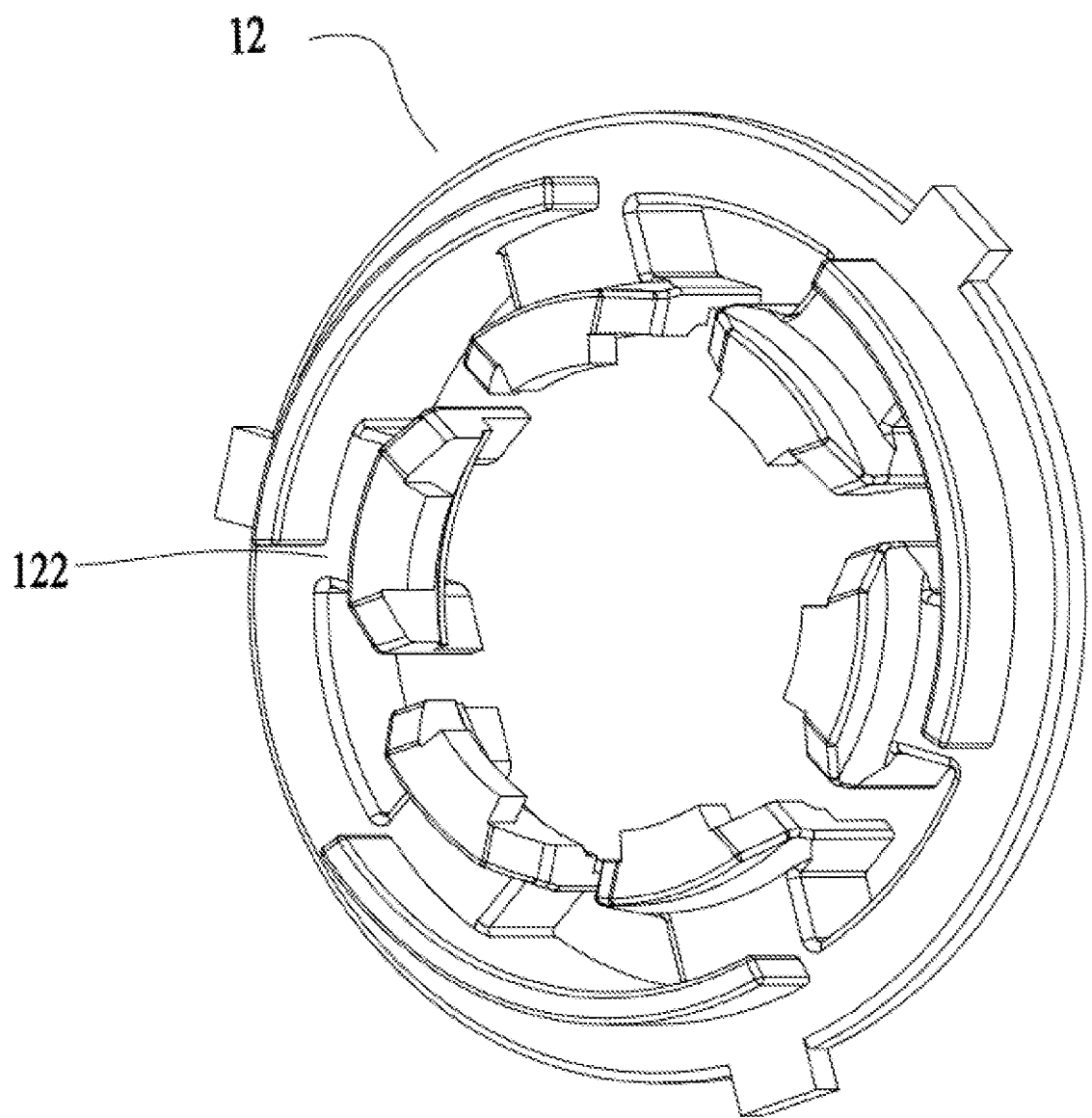
FIG. 6 is a perspective view of a rear insulating frame of the brushless motor shown in FIG. 2 viewed from the rear side.
Figure 7:
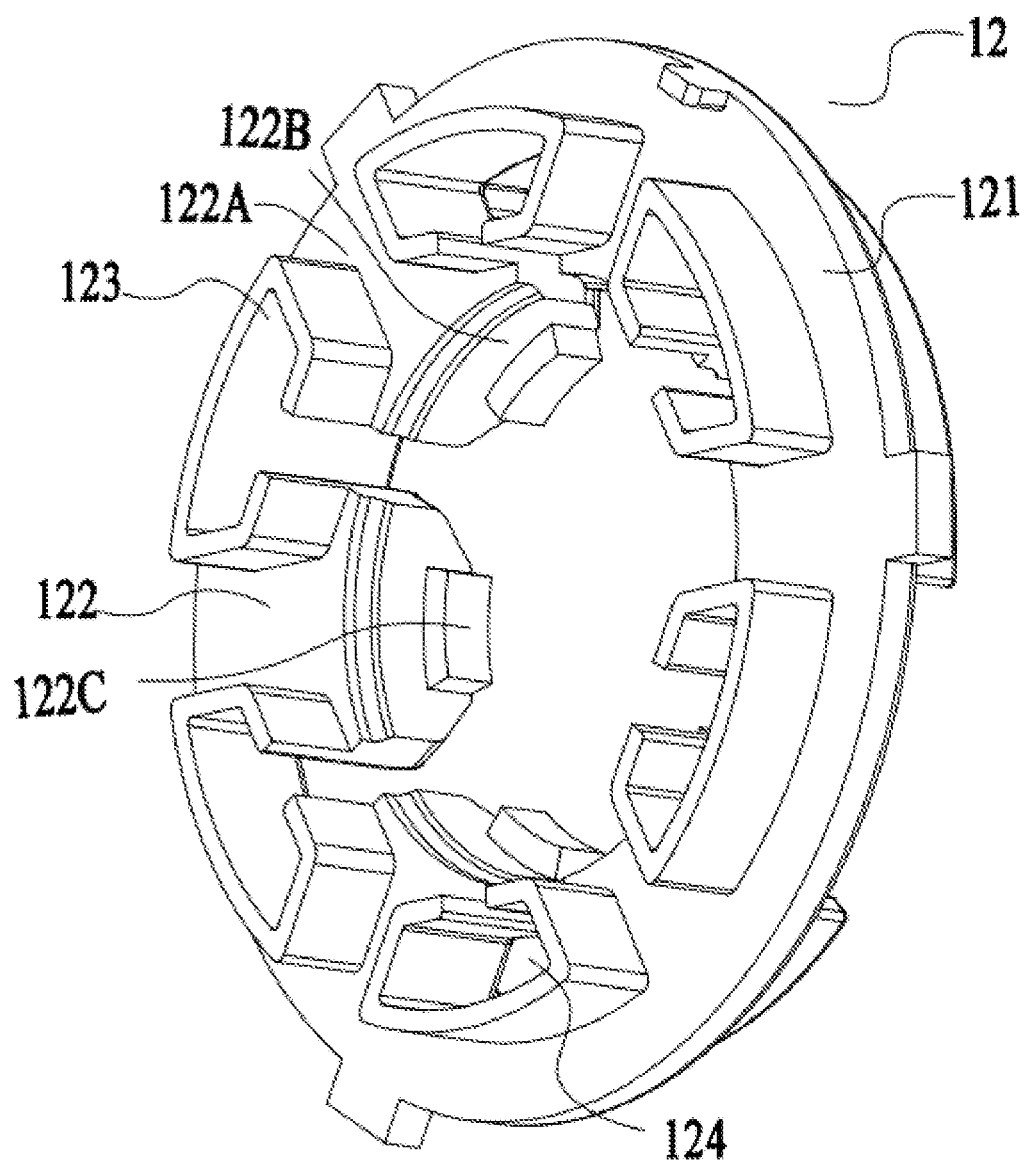
FIG. 7 is a perspective view of the rear insulating frame of the brushless motor shown in FIG. 2 viewed from the front side.

Referring to FIG. 6 and FIG. 7, the rear insulating frame 12 includes an integrally-formed second insulating base ring 121 and multiple second insulating bobbins 122 disposed on the inner wall of the second insulating base ring 121 in the radial direction. The front side of the rear insulating frame 12 is protrudingly provided with second engaging portions 123 engaged with the slots of the silicon steel sheet group 13. The inner side of each second engaging portion 123 is provided with a second groove 124 extending in the axial direction. In this example, the number of the second engaging portions is 6. Each second insulating bobbin 122 includes a second connection board 122A and a rear inner protective plate 122B fixed on the inner side of the second connection board 122A. Same spacing is configured between every two adjacent rear inner protective plates 122B. The radially inner side of each rear inner protective plate 122B is provided with a protrusion 122C extending in the circumference of the second insulating base ring 121. Same spacing exists between every two adjacent protrusions 122C.

During assembly, the first engaging portions 113 of the front insulating frame 11 and the second engaging portions 123 of the rear insulating frame 12 are axially sleeved into the slots of the silicon steel sheet group 13, and the coil 14 are wound around the front insulating frame 11 and the silicon steel sheet group 13 and around the rear insulating frame 12 and the silicon steel sheet group 13 so that the stator 10 is formed.

As illustrated in FIG. 3, the rotor 20 has a front side and a rear side, and the rotor 20 includes a front-end cover 21, a rear-end cover 22, a rotating shaft 23, a front bearing 24 and a rear bearing 25. The front bearing 24 is installed in the front-end cover 21, and the rear bearing 25 is installed in the rear-end cover 22. The front bearing 24 is installed at the front end of the rotating shaft 23 of the rotor 20. The rear bearing 25 is installed at the rear end of the rotating shaft 23 of the rotor 20.

The outer surface of the front-end cover 21 is provided with multiple second snap parts in the circumference. In some examples, the second snap parts may be snap grooves 211, and same spacing exists between every two adjacent snap grooves 211 in the circumference. To position the stator 10 at the front bearing 24, the front-end cover 21 is installed on the front bearing 24, the front insulating frame 11 is installed on the front-end cover 21, and then the second snap parts are snap-fitted with the first snap parts. Specifically, the elastic hook portions 115 on the front side of the front insulating frame 11 is snap-fitted with the snap grooves 211 on the radial outer surface of the front-end cover 21 so that the front insulating frame 11 is positioned on the front-end cover 21.

Figure 8:
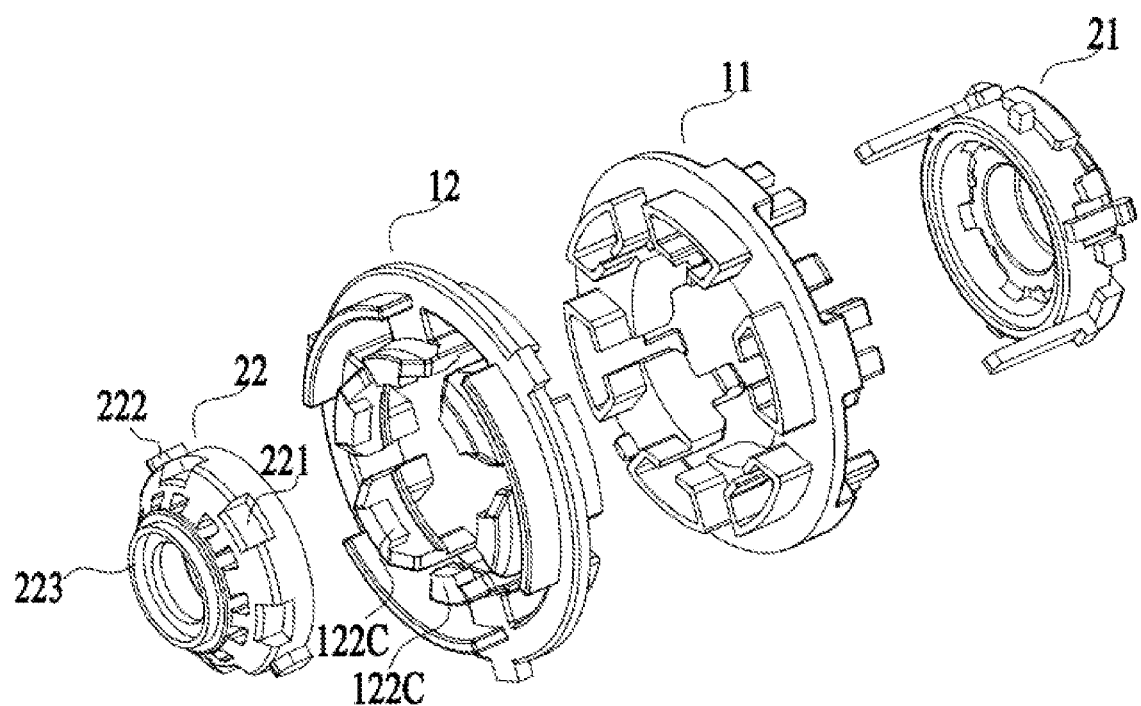
FIG. 8 is a perspective exploded view of part of the components of the brushless motor shown in FIG. 2 viewed from the front side.
Figure 9:
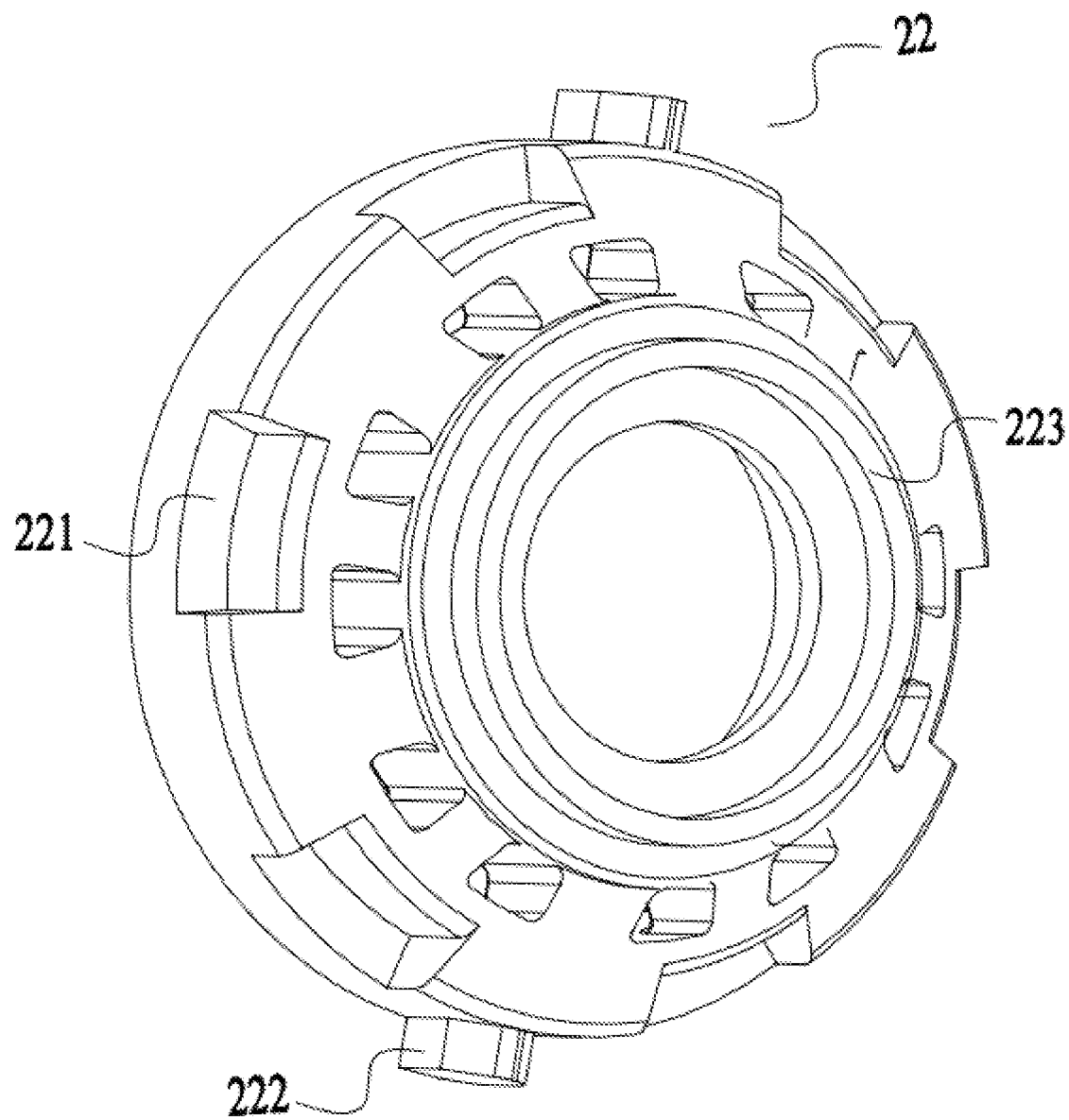
FIG. 9 is a perspective view of a rear-end cover of the brushless motor shown in FIG. 2.

The rear-end cover 22 abuts against the rear insulating frame 12. For specific implementations, referring to FIGS. 8 to 9. Multiple limiting grooves 221 are evenly disposed on the outer surface of the rear-end cover 22, and same spacing exists between every two adjacent limiting grooves 221.

To position the stator 10 at the rear bearing 25, in the case where the rear insulating frame 12 is installed on the rear-end cover 22, the radially outer side of the rear-end cover 22 is connected to the radially inner side of the rear insulating frame 12. In some examples, the protrusions 122C on the radially inner side of the rear inner protective plates 122B abut against the limiting grooves 221 on the radial outer surface of the rear-end cover 22, and the axial movement of the rear-end cover 22 provided with the limiting grooves 221 is restricted by the protrusions 122C.

In addition, in some examples, to accurately align the rear-end cover 22 with the rear insulating frame 12 during installation, multiple guide columns 222 extending in the axial direction are evenly disposed on the radially outer side of the rear-end cover 22 in the circumference. In the case where the rear-end cover 22 is in contact with the rear insulating frame 12, the guide columns 222 are positioned along the second grooves 124 on the rear inner protective plates 122B of the rear insulating frame 12.

Referring to FIG. 1, a fan 30 is press-fitted on the rotating shaft 23. To fix the rear-end cover 22 firmly in the axial direction, the front-end surface of the fan 30 is provided with an annular groove 31, and the rear side of the rear-end cover 22 is provided with an annular protrusion 223. During installation, the annular protrusion 223 is in mating contact with the annular groove 31.

Referring to FIG. 2, to make the front-end cover 21 closely fit with the front insulating frame 11, a fixing collar 40 is sleeved on the radial outer surface of the front-end cover 21 and the radial outer surface of the front insulating frame 11. In the case where the handheld power tool 1 is assembled, the brushless motor 2 is assembled at first. After the brushless motor 2 is assembled, the entire brushless motor 2 is installed in the handheld power tool 1.

In some examples, the method of assembling the brushless motor 2 is described below.

Firstly, the first engaging portions 113 of the front insulating frame 11 and the second engaging portions 123 of the rear insulating frame 12 are axially sleeved into the grooves of the silicon steel sheet group 13, and the coil 14 are wound around the front insulating frame 11 and the silicon steel sheet group 13 and around the rear insulating frame 12 and the silicon steel sheet group 13 so that the stator 10 is formed.

Secondly, the rear-end cover 22 is pressed into the rear bearing 25 installed on the rotating shaft 23, and the rear-end cover 22 and the rotor 20 are inserted into the stator 10 in the axial direction until the protrusions 122C on the inner side of the rear inner protective plates 122B are connected to the limiting grooves 221 on the outer side of the rear-end cover 22.

Thirdly, the front-end cover 21 is pressed into the front bearing 24 installed on the rotating shaft 23 until the elastic hook portions 115 on the front side of the front insulating frame 11 is snap-fitted with the snap grooves 211 on the outer side of the front-end cover 21.

In the present disclosure, the outer side of the rear-end cover 22 is connected to the inner side of the rear insulating frame 12, and the outer side of the front-end cover 21 is snap-fitted with the inner side of the front insulating frame 11. In this manner, on the one hand, the number of parts of the integrated electric motor can be reduced, the assembly process can be simplified, and relatively low manufacturing costs can be guaranteed; on the other hand, the high coaxiality of the stator and rotor of the integrated electric motor can be achieved.

The present disclosure provides a brushless motor. The brushless motor includes a stator and a rotor.

The stator has a front side and a rear side.

The rotor has a front side and a rear side and is installed in the stator.

The stator includes a front insulating frame and a rear insulating frame.

The front insulating frame is located on the front side of the stator.

The rear insulating frame is located on the rear side of the stator.

The rotor includes a rotating shaft, a front bearing, a rear bearing, a front-end cover and a rear-end cover.

The rotating shaft is configured to rotate around a first axis.

The front bearing is installed at the front end of the rotating shaft.

The rear bearing is installed at the rear end of the rotating shaft.

The front-end cover is located on the front side of the rotor and installed on the front bearing.

The rear-end cover is located on the rear side of the rotor. The rear-end cover is installed on the rear bearing and abuts against the rear insulating frame.

The front side of the front insulating frame is provided with multiple first snap parts.

The front-end cover is provided with multiple second snap parts in the circumference. The first snap parts are snap-fitted with the second snap parts.

In some examples, the first snap parts are elastic hook portions and the second snap parts are snap grooves.

In some examples, the radially outer side of the rear-end cover is connected to the radially inner side of the rear insulating frame.

In some examples, the radially outer side of the rear-end cover is provided with multiple limiting grooves.

The radially inner side of the rear insulating frame is provided with rear inner protective plates and the rear inner protective plates are provided with multiple protrusions.

The multiple protrusions of the rear insulating frame abut against the multiple limiting grooves of the rear-end cover thus restricting the axial movement of the rear-end cover.

The present disclosure provides a handheld power tool. The handheld power tool includes a housing, an output shaft, a gear box assembly and a brushless motor.

The housing is configured to accommodate a brushless motor.

The output shaft is configured to be driven by the brushless motor to rotate around a first axis.

The gear box assembly is configured to achieve transmission of power between the brushless motor and the output shaft.

The brushless motor includes a stator and a rotor.

The stator has a front side and a rear side.

The rotor has a front side and a rear side and is installed in the stator.

The stator includes a front insulating frame and a rear insulating frame.

The front insulating frame is located on the front side of the stator.

The rear insulating frame is located on the rear side of the stator.

The rotor includes a rotating shaft, a front bearing, a rear bearing, a front-end cover and a rear-end cover.

The rotating shaft is rotatable around the first axis.

The front bearing is installed at the front end of the rotating shaft.

The rear bearing is installed at the rear end of the rotating shaft.

The front-end cover is located on the front side of the rotor and installed on the front bearing.

The rear-end cover is located on the rear side of the rotor. The rear-end cover is installed on the rear bearing and abuts against the rear insulating frame.

The front side of the front insulating frame is provided with multiple first snap parts.

The front-end cover is provided with multiple second snap parts in the circumference.

The first snap parts are snap-fitted with the second snap parts.

In some examples, the first snap parts are elastic hook portions and the second snap parts are snap grooves.

In some examples, the radially outer side of the rear-end cover is provided with multiple limiting grooves.

The radially inner side of the rear insulating frame is provided with rear inner protective plates and the rear inner protective plates are provided with multiple protrusions.

The multiple protrusions of the rear insulating frame abut against the multiple limiting grooves of the rear-end cover so that the axial movement of the rear-end cover is limited.

In some examples, the radially outer side of the rear-end cover is connected to the radially inner side of the rear insulating frame.

In some examples, the handheld power tool is an electric drill or an impact wrench.

The present disclosure provides a brushless motor. The number of parts of the integrated electric motor is reduced, the assembly process is simplified, a relatively low manufacturing cost is guaranteed, and a high coaxiality between the stator and the rotor of the brushless motor is achieved.

What is claimed is:

1. A brushless motor, comprising:
a stator having a front side and a rear side; and
a rotor having a front side and a rear side and installed in the stator,
wherein the stator comprises a front insulating frame disposed on the front side of the stator and a rear insulating frame disposed on the rear side of the stator, the rotor comprises a rotating shaft rotatable around a first axis, a front bearing installed at a front end of the rotating shaft; a rear bearing installed at a rear end of the rotating shaft, a front-end cover disposed on the front side of the rotor and installed on the front bearing, and a rear-end cover disposed on the rear side of the rotor, the rear-end cover is installed on the rear bearing and abuts against the rear insulating frame, a front side of the front insulating frame is provided with a plurality of first snap parts, the front-end cover is provided with a plurality of second snap parts in a circumference of the front-end cover, and the plurality of first snap parts is snap-fitted with the plurality of second snap parts,
wherein each of the plurality of first snap parts is an elastic hook portion and each of the plurality of second snap parts is a snap groove, and
wherein a radially outer side of the rear-end cover is connected to a radially inner side of the rear insulating frame.

2. The brushless motor of claim 1, wherein the radially outer side of the rear-end cover is provided with a plurality of limiting grooves, the radially inner side of the rear insulating frame is provided with rear inner protective plates, the rear inner protective plates are provided with a plurality of protrusions, and the plurality of protrusions of the rear insulating frame abuts against the plurality of limiting grooves of the rear-end cover thus restricting an axial movement of the rear-end cover.

3. The brushless motor of claim 1, wherein a fan is press-fitted on the rotating shaft.

4. The brushless motor of claim 3, wherein a front-end surface of the fan is provided with an annular groove, the rear side of the rear-end cover is provided with an annular protrusion, and the annular protrusion is in mating contact with the annular groove.

5. A handheld power tool, comprising:
a brushless motor;
a housing configured to accommodate the brushless motor;
an output shaft configured to be driven by the brushless motor to rotate around a first axis; and
a gear box assembly configured to enable power transmission between the brushless motor and the output shaft,
wherein the brushless motor comprises a stator having a front side and a rear side, and a rotor having a front side and a rear side and installed in the stator, the stator comprises a front insulating frame disposed on the front side of the stator, and a rear insulating frame disposed on the rear side of the stator, the rotor comprises a rotating shaft rotatable around the first axis, a front bearing installed at a front end of the rotating shaft, a rear bearing installed at a rear end of the rotating shaft, a front-end cover disposed on the front side of the rotor and installed on the front bearing, and a rear-end cover disposed on the rear side of the rotor, the rear-end cover is installed on the rear bearing and abuts against the rear insulating frame, a front side of the front insulating frame is provided with a plurality of first snap parts, the front-end cover is provided with a plurality of second snap parts in a circumference of the front-end cover, and the plurality of first snap parts is snap-fitted with the plurality of second snap parts, and
wherein each of the plurality of first snap parts is an elastic hook portion and each of the plurality of second snap parts is a snap groove, and
wherein a radially outer side of the rear-end cover is provided with a plurality of limiting grooves, a radially inner side of the rear insulating frame is provided with rear inner protective plates, the rear inner protective plates are provided with a plurality of protrusions, and the plurality of protrusions of the rear insulating frame abut against the plurality of limiting grooves of the rear-end cover thus restricting an axial movement of the rear-end cover.

6. The handheld power tool of claim 5, wherein the radially outer side of the rear-end cover is connected to the radially inner side of the rear insulating frame.

7. The handheld power tool of claim 6, wherein the handheld power tool comprises one of an electric drill and an impact wrench.

* * * * *